United States Patent [19]
Wolford et al.

[11] 3,904,700
[45] Sept. 9, 1975

[54] FLAME-RETARDANT COMPOSITION

[75] Inventors: Lionel T. Wolford, Freehold; Francis T. Wadsworth, Trenton, both of N.J.

[73] Assignee: Cities Service Oil Company, Tulsa, Okla.

[22] Filed: Dec. 10, 1973

[21] Appl. No.: 423,030

Related U.S. Application Data

[62] Division of Ser. No. 313,900, Dec. 11, 1972.

[52] U.S. Cl. ......... 260/649 R; 106/15 FP; 117/136; 252/8.1; 260/45.7 R; 260/45.75 R
[51] Int. Cl.² ......................................... C07C 25/18
[58] Field of Search ................................. 260/649 R

[56] References Cited
UNITED STATES PATENTS
2,658,926  11/1953  Hyman et al .................... 260/649 R

OTHER PUBLICATIONS
Danish et al., J. Am. Chem. Soc., 76, 6144–6150, (1954).

*Primary Examiner*—D. Horwitz
*Attorney, Agent, or Firm*—Patricia J. Hogan

[57] ABSTRACT

Novel compounds, useful as flame retardants for normally flammable organic polymers, correspond to the formula:

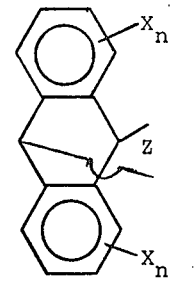

wherein X is chloro or bromo, $n$ is an integer of 0–4, and Z is a divalent saturated polybromoalkylene or polybromocycloalkylene group containing 4–20 carbon atoms and 2–8 bromine atoms; said valences being on adjacent carbon atoms. A preferred flame retardant is the dibrominated 1:1 Diels-Alder adduct of anthracene and cyclooctadiene-1,5.

1 Claim, No Drawings

FLAME-RETARDANT COMPOSITION

This is a division of application Ser. No. 313,900, filed Dec. 11, 1972.

BACKGROUND OF THE INVENTION

1. Field of the Invention

This invention relates to novel halogenated organic compounds and to polymeric compositions containing them as flame retardants.

2. Description of the Prior Art

It is known that halogenated compounds are sometimes useful for imparting flame retardancy to normally flammable organic polymers. However, the halogenated compounds which have been proposed for use as flame retardants usually have one or more of the following disadvantages: volatility, instability at processing temperatures, incompatibility, and inefficiency.

If the halogenated compound is too volatile, it does not remain in the polymer to function as a flame retardant when needed. If it is unstable at processing temperatures, it decomposes to cause corrosion of the equipment and discoloration of the polymer. If it is incompatible with the polymer, it exudes to the surface to form an esthetically unpleasing deposit, the removal of which results in removing the flame retardancy which the compound was supposed to impart. If it is inefficient, it must be used in such high concentrations that it has an unduly deleterious effect on polymer properties and unduly increases the cost of the fabricated polymer.

Since some of these disadvantages make a compound less than desirable for use as a flame retardant, and others actually prevent it from having any practical utility as a flame retardant, it is apparent that there is a need for a flame retardant which is substantially nonvolatile, stable at processing temperatures, compatible, and efficient.

It is believed that the general lack of success of the prior art in producing such a flame retardant is at least partially due to the tendency of a given factor to degrade at least one of these properties while improving another. For instance, it has been found that compounds containing aliphatic or cycloaliphatic bromine are sometimes more efficient than other halogenated compounds, but these compounds have poor stability at processing temperatures and frequently have other disadvantages, such as volatility and incompatibility. Compounds containing vinylic bromine are more stable but less efficient, and they may also be too volatile and incompatible.

SUMMARY OF THE INVENTION

An object of this invention is to provide novel halogenated organic compounds.

Another object is to provide such compounds which are useful as flame retardants and avoid the aforementioned disadvantages of many of the known halogenated flame retardants.

A further object is to provide flame-retardant organic polymer compositions containing these compounds.

These and other objects are attained by providing compounds corresponding to the formula:

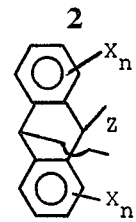

wherein X is chloro or bromo, n is an integer of 0–4, and Z is a divalent saturated polybromoalkylene or polybromocycloalkylene group containing 4–20 carbon atoms and 2–8 bromine atoms; said valences being on adjacent carbon atoms. When a flame-retardant composition is desired, a compound of this formula is intimately mixed with a normally flammable organic polymer.

DESCRIPTION OF THE PREFERRED EMBODIMENTS

The flame retardant of the invention may be any compound corresponding to the above formula. However, it is preferably one in which Z is a polybromocycloalkylene group (most preferably a monocyclic polybromocycloalkylene group), contains 5–16 carbon atoms and 2–6 bromine atoms (most preferably 8–12 carbon atoms and 2–4 bromine atoms), has at least some (most preferably all) of the bromine atoms substituted on cycloaliphatic carbon atoms, and/or has the bromine atoms paired in vicinal positions. A particularly preferred flame retardant is the dibrominated 1:1 Diels-Alder adduct of anthracene and cyclooctadiene-1,5, which has the following structural formula:

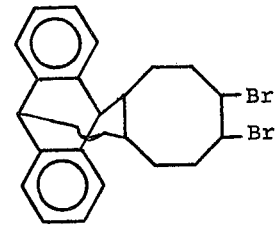

These compounds may be prepared by reacting anthracene or a halogenated anthracene with a suitable multiunsaturated aliphatic or cycloaliphatic hydrocarbon to form a 1:1 Diels-Alder adduct, e.g., by the process of British Pat. No. 1,015,875, and then brominating the adduct by known halogenation techniques to add bromine to the residual unsaturation and optionally also to the anthracene ring. Alternatively, the bromine may be introduced by starting with an unsaturated aliphatic or cycloaliphatic bromide.

Anthracenes useful as starting materials include anthracene, 2-chloroanthracene, 1,2-dibromoanthracene, 1,2,6,7-tetrachloroanthracene, 1,2,3,4,6,7,8,9-octabromoanthracene, etc. Multiunsaturated aliphatic and cycloaliphatic hydrocarbons suitable for use in preparing the flame retardants of the invention include butadiene, isoprene, hexadiene-1,4, hexatriene-1,3,5, octadiene-1,7, octatriene-1,3,7, 3-methylheptatriene-1,4,6, decadiene-1,9, decatriene-1,4,9, dodecadiene-1,11, dodecatetraene-1,5,7,11, hexadecadiene-1,15, eicosadiene-1,19, cyclopentadiene, bicycloheptadiene, 4-vinyleyclohexene, divinylcyclohexane, cyclooctadiene-1,3, cyclooctadiene-1,5, dicyclopentadiene, cyclodecadiene-1,5, trivinylcyclohexane, cycloheptatriene-1,3,6, cyclododecatriene-1,5,9, trimethylcyclododecatriene-1,5,9, bis(cyclohexenyl) ethylene, cyclooctatetraene, cyclohexadecatetraene-1,5,9,13, etc. When an unsaturated bromide is used as a starting material, it is usually a mono-unsaturated polybromide, such as 1,2-dibromobutene-3, 1,2,5,6,9,10-hexabromocyclohexadecene-13, the other mono-unsaturated polybromides corresponding to the aforementioned hydrocarbons, etc, although, like the hydrocarbons, polybromides having more than one double bond may be employed when the adduct formed therefrom is to be brominated to remove residual unsaturation.

The flame retardants of the invention may be the polybrominated 1:1 Diels-Alder adducts of any of the aforementioned anthracenes with any of the aforementioned multiunsaturated hydrocarbons or unsaturated bromides, or they may be polybrominated 1:1 Diels-Alder adducts of equivalent reactants.

The normally flammable organic polymer which is rendered flame retardant in accordance with the invention may be natural or synthetic but is preferably a solid synthetic polymer, more preferably a polymer of an unsaturated hydrocarbon. Exemplary of the polymers are cotton, wool, silk, paper, natural rubber, wood, paint, the high molecular weight homopolymers and copolymers of unsaturated aliphatic and aromatic hydrocarbons (e.g., ethylene, propylene, styrene, etc.), acrylic polymers (e.g., polyacrylonitrile, polymethyl methacrylate, etc.), alkyd resins, cellulose derivatives (e.g., cellulose acetate, methyl cellulose, etc.) epoxy resins, furan resins, isocyanate resins (e.g., polyurethanes), melamine resins, vinyl resins (e.g., polyvinyl acetate, polyvinyl chloride, etc.), polyamide resins (e.g., Nylon 6, Nylon 66, etc.), resorcinol resins, synthetic rubbers (e.g., polyisoprene, polybutadiene, butadiene-acrylonitrile copolymers, butadiene-styrene copolymers, butyl rubber, neoprene rubber, etc.), ABS resins, and mixtures thereof. According to a preferred embodiment of the invention, the normally flammable organic polymer is polypropylene, polyethylene, polystyrene, an impact polystyrene (i.e., a rubber-modified polystyrene), or an ABS resin (i.e., a diene rubber-modified monovinylidene aromatic compoundunsaturated nitrile interpolymer).

Since the flame retardants of the invention are unusually efficient, they are normally used at low concentrations, e.g., about 1-25%, preferably about 4-20%, based on the weight of the composition. To reduce the amount of flame retardant required to achieve a desired level of flame retardancy, it is frequently desirable to employ a synergist for the flame retardant, e.g., a free radicalgenerating compound such as dicumyl peroxide, a conventional metal compound synergist, or an aliphatic or cycloaliphatic phosphite or thiophosphite containing not more than one aromatic radical per phosphorus atom, e.g., distearyl pentaerythritol diphosphite.

Ordinarily the synergist, when employed, is any of the metal compounds conventionally used as synergists for halogentated flame retardants. Thus, it may be an organometallic compound but is usually an oxide or sulfide of a polyvalent metal such as antimony, arsenic, bismuth, tin, or titanium. Of such compounds, antimony trioxide is preferred. This type of synergist is normally employed in a concentration of about 20-100%, preferably about 50%, based on the weight of the flame retardant.

The flame-retardant compositions of the invention are prepared by intimately mixing the normally flammable organic polymer with the flame retardant and optionally also with other additives, such as synergists, fillers, pigments, plasticizers, stabilizers, and antioxidants, in any suitable manner. For example, the ingredients may be mixed on a two-roll mill or in an extruder or Banbury mixer.

The invention is advantageous in that the novel compounds of the invention have low volatility and good stability at polymer processing temperatures and are effective as flame retardants at sufficiently low concentrations to minimize degradation of physical properties.

The following example is given to illustrate the invention and is not intended as a limitation thereof. Unless otherwise specified, quantities mentioned are quantities by weight.

EXAMPLE

Part A

Heat a mixture of 89 parts of anthracene and 432 parts of cyclooctadiene-1,5 at 220°C. for 18 hours. Remove excess cyclooctadiene-1,5 by distillation, and add cyclohexane. Filter off insoluble material to obtain a cyclohexane solution of 112 parts of the 1:1 adduct of anthracene and cyclooctadiene-1,5.

Part B

Treat 103 parts of the adduct of Part A with 60 parts of bromine in a cyclohexane/t-butanol solvent at 25°C. to form 116 parts of a colorless solid having a melting point of 201°–203°C. and a bromine content of 35.6%. The product corresponds to the formula:

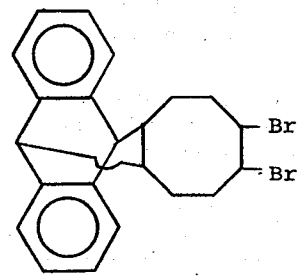

Part C

Blend 87.4 parts of polypropylene with 8.4 parts of the product of Part B and 4.2 parts of antimony trioxide. Compression mold a test specimen from the blend and test it in accordance with ASTM-D-2863. The blend has an oxygen index of 28.4.

Self-extinguishing compositions are also obtained when polyethylene, polystyrene, impact polystyrene, and ABS are modified by the incorporation of the dibrominated adduct of the example or the other brominated adducts taught in the specification.

It is obvious that many variations may be made in the products and processes set forth above without departing from the spirit and scope of this invention.

What is claimed is:

1. A compound corresponding to the formula:

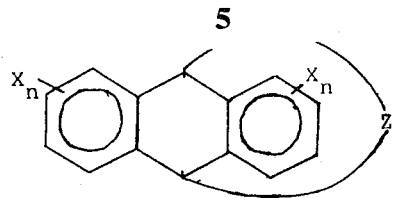
wherein X is chloro or bromo, n is 0 or integer of 1–4
and Z is a divalent saturated polybromoalkylene or polybromocycloalkylene group containing 4–20 carbon atoms and 2–8 bromine atoms; said valences being on adjacent carbon atoms.
* * * * *

PO-1050
(5/69)

UNITED STATES PATENT OFFICE
CERTIFICATE OF CORRECTION

Patent No. 3,904,700            Dated September 9, 1975

Inventor(s) Wolford et al.

It is certified that error appears in the above-identified patent and that said Letters Patent are hereby corrected as shown below:

Page 1, left-hand column, line 5, the "Assignee" should read --Cities Service Company--.

Signed and Sealed this ninth Day of December 1975

[SEAL]

Attest:

RUTH C. MASON
*Attesting Officer*

C. MARSHALL DANN
*Commissioner of Patents and Trademarks*